United States Patent
Yagiura et al.

(10) Patent No.: US 12,026,689 B2
(45) Date of Patent: Jul. 2, 2024

(54) ACCOUNTING SYSTEM, TERMINAL, AND INFORMATION PROCESSING METHOD

(71) Applicant: NEC Platforms, Ltd., Kawasaki (JP)

(72) Inventors: Kouji Yagiura, Kanagawa (JP); Tomoya Nakagawasai, Kanagawa (JP); Hiroyasu Hasegawa, Kanagawa (JP); Terukazu Kaneko, Kanagawa (JP); Mitsuki Fujisaki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 18/089,315

(22) Filed: Dec. 27, 2022

(65) Prior Publication Data
US 2023/0214806 A1    Jul. 6, 2023

(30) Foreign Application Priority Data
Jan. 5, 2022    (JP) .................................. 2022-000429

(51) Int. Cl.
G06Q 20/18    (2012.01)
G06Q 20/20    (2012.01)

(52) U.S. Cl.
CPC .......... *G06Q 20/18* (2013.01); *G06Q 20/202* (2013.01)

(58) Field of Classification Search
CPC ............................ G06Q 20/18; G06Q 20/202
USPC ....................................................... 235/379
See application file for complete search history.

(56) References Cited

U.S. PATENT DOCUMENTS

| | | | | |
|---|---|---|---|---|
| 2002/0194129 A1* | 12/2002 | Furuya | ................ | G07F 7/0886 705/41 |
| 2006/0122896 A1* | 6/2006 | Parsley | ................ | G06Q 30/02 705/26.1 |
| 2014/0087686 A1* | 3/2014 | Lee | ........................ | H04W 4/90 455/404.1 |
| 2015/0287010 A1* | 10/2015 | Hasegawa | ............ | G06Q 20/20 705/21 |

(Continued)

FOREIGN PATENT DOCUMENTS

| | | |
|---|---|---|
| JP | H05-298334 A | 11/1993 |
| JP | 2009-087297 A | 4/2009 |

(Continued)

OTHER PUBLICATIONS

JP Office Action for JP Application No. 2022-000429, mailed on Nov. 22, 2022 with English Translation.

*Primary Examiner* — Allyson N Trail
(74) *Attorney, Agent, or Firm* — Sughrue Mion, PLLC

(57) ABSTRACT

An accounting system according to the present disclosure includes a terminal that is placed on a table used by a customer, a connection apparatus that is connected to the terminal at the time of accounting, and a server that communicates with the terminal and the connection apparatus via a network. The terminal receives an order for a product from the customer and then transmits table identification information by which the table can be identified and product information regarding the product to the server, the server stores the table identification information and the product information in association with each other as accounting information, and the terminal acquires, when it is connected to the connection apparatus, the accounting information associated with the table identification information from the server and performs accounting processing.

8 Claims, 20 Drawing Sheets

(56) References Cited

U.S. PATENT DOCUMENTS

| | | | | |
|---|---|---|---|---|
| 2016/0180368 A1* | 6/2016 | Booth | ................ | G06Q 30/0238 |
| | | | | 705/14.27 |
| 2020/0320188 A1* | 10/2020 | Graff | ................... | H04L 63/0861 |
| 2022/0173513 A1* | 6/2022 | Hernandez | ............. | H01R 12/78 |
| 2023/0093859 A1* | 3/2023 | Nakanishi | .............. | G06Q 50/12 |
| | | | | 705/5 |
| 2023/0325804 A1* | 10/2023 | Shao | ....................... | H04W 4/02 |
| | | | | 705/23 |

FOREIGN PATENT DOCUMENTS

| | | |
|---|---|---|
| JP | 2014-038555 A | 2/2014 |
| JP | 2017-090995 A | 5/2017 |
| JP | 2020-030773 A | 2/2020 |
| JP | 2020-201612 A | 12/2020 |
| JP | 2021-114189 A | 8/2021 |
| WO | 2019/139145 A1 | 7/2019 |

* cited by examiner

| NUMBER OF PERSONS | CHARACTERISTICS OF CUSTOMERS | TABLE NUMBER |
|---|---|---|
| 2 | OFFICE WORKER | A |
| 4 | FAMILY | B |
| ... | ... | ... |

| ORDER NUMBER | TABLE NUMBER | NUMBER OF PERSONS | ORDERED PRODUCT | ORDER TIME |
|---|---|---|---|---|
| 1 | A | 2 | PRODUCT a | 11/18 14 : 14 |
| 1 | A | 2 | PRODUCT b | 11/18 14 : 14 |
| 5 | A | 2 | PRODUCT c | 11/18 14 : 34 |

| PRODUCT CODE | PRODUCT NAME | PRICE |
|---|---|---|
| 001 | PRODUCT a | 680YEN |
| 002 | PRODUCT b | 880YEN |
| 003 | PRODUCT c | 1080YEN |

| ORDER NUMBER | TABLE NUMBER | NUMBER OF PERSONS | ORDERED PRODUCT | ORDER TIME |
|---|---|---|---|---|
| 1 | A | 2 | PRODUCT a | 11/18 14:14 |
| 1 | A | 2 | PRODUCT b | 11/18 14:14 |
| 2 | B | 4 | PRODUCT d | 11/18 14:20 |
| 3 | B | 4 | PRODUCT e | 11/18 14:20 |
| 4 | B | 4 | PRODUCT f | 11/18 14:20 |
| 5 | A | 2 | PRODUCT c | 11/18 14:34 |

| CHANGE MACHINE NUMBER | DATE | RECEIPT NUMBER IN CASH ACCOUNTING | BALANCE IN CHANGE MACHINE |
|---|---|---|---|
| 1 | 11/18 | 1 | 123,456YEN |
| 2 | 11/18 | 7 | 234,567YEN |

| CHANGE MACHINE NUMBER | MONEY | NUMBER OF COINS |
|---|---|---|
| 1 | 1YEN | 46 |
| 1 | 5YEN | 20 |
| 1 | 10YEN | ・・・ |
| 1 | 50YEN | ・・・ |
| 1 | ・・・ | ・・・ |

| ACCOUNTING FLAG | TABLE NUMBER | ORDERED PRODUCT | PRICE |
|---|---|---|---|
| NOT YET | A | PRODUCT a | 680YEN |
| NOT YET | A | PRODUCT b | 880YEN |
| NOT YET | A | PRODUCT c | 1080YEN |

2942

| RECEIPT NUMBER | ACCOUNTING TIME | TABLE NUMBER | NUMBER OF PERSONS | TOTAL PRICE | ACCOUNTING METHOD | ACCOUNTING FLAG |
|---|---|---|---|---|---|---|
| 1 | 11/18 15:30 | A | 2 | 2,640YEN | CASH | DONE |
| 2 | - | B | 4 | 4,560YEN | - | NOT YET |

| RECEIPT NUMBER | TABLE NUMBER | NUMBER OF PERSONS | ORDER TIME | ACCOUNTING TIME | ORDER DETAILS (INCLUDING PRICE) | ACCOUNTING METHOD |
|---|---|---|---|---|---|---|
| 1 | A | 2 | 11/18 14 : 14 | 11/18 15 : 30 | · PRODUCT a<br>· PRODUCT b<br>· PRODUCT c<br>TOTAL: 2,640 YEN | CASH |
| 2 | B | 4 | XXX | XXX | XXX | CREDIT CARD |
| 3 | A | XXX | XXX | XXX | XXX | ELECTRONIC MONEY |

| ORDER NUMBER | TABLE NUMBER | PRODUCT NAME | TIME WHEN PRODUCT HAS BEEN PROVIDED |
|---|---|---|---|
| 1 | A | PRODUCT NAME a | 11/18 14 : 20 |
| 1 | A | PRODUCT NAME b | 11/18 14 : 20 |
| 5 | A | PRODUCT NAME c | 11/18 14 : 40 |

| ATTACHMENT OR NON-ATTACHMENT | APPLICATION USED | ACCOUNTING PERMISSION DETERMINATION | ACCOUNTING FLAG | TABLE NUMBER |
|---|---|---|---|---|
| ATTACHED | APPLICATION FOR ACCOUNTING | PERMITTED | DONE | A |
| NOT ATTACHED | APPLICATION FOR ORDERING | NOT PERMITTED | NOT YET | A |

Fig. 17

ACCOUNTING SYSTEM, TERMINAL, AND INFORMATION PROCESSING METHOD

INCORPORATION BY REFERENCE

This application is based upon and claims the benefit of priority from Japanese patent application No. 2022-429, filed on Jan. 5, 2022, the disclosure of which is incorporated herein in its entirety by reference.

TECHNICAL FIELD

The present disclosure relates to an accounting system, a terminal, an information processing method, and a non-transitory computer readable medium.

BACKGROUND ART

An ordering system in which customers order food using self-order terminals in an eating place or the like has been known. As related art, Japanese Unexamined Patent Application Publication No. 2020-030773 discloses an order terminal including an order processing unit and a payment processing unit, the order processing unit being configured to perform order processing for inputting orders executed in an order application, the payment processing unit being configured to conduct payment processing executed in a payment application. With this order terminal, the order can be linked to payment for food, beverage and other charges, so that a customer can conduct order processing and payment processing using the order terminal by himself/herself.

SUMMARY

In a system that uses the order terminal as disclosed in Japanese Unexamined Patent Application Publication No. 2020-030773, a customer needs to operate the screen of the order terminal by himself/herself to select a method for payment after he/she finishes eating or drinking. Further, since the order terminal cannot process a cash payment, if the customer prefers to pay by cash, he/she needs to make payment with the need for the help of staff.

In view of the aforementioned problem, an object of the present disclosure is to provide an accounting system, a terminal, an information processing method, and a non-transitory computer readable medium capable of enabling customers to pay bills more efficiently.

An accounting system according to a first aspect of the present disclosure includes:
  a terminal that is placed on a table used by a customer;
  a connection apparatus that is connected to the terminal at the time of accounting; and
  a server that communicates with the terminal and the connection apparatus via a network,
in which
  the terminal receives an order for a product from the customer and then transmits table identification information by which the table can be identified and product information regarding the product to the server,
  the server stores the table identification information and the product information in association with each other as accounting information, and
  the terminal acquires, when the terminal is connected to the connection apparatus, the accounting information associated with the table identification information from the server and then performs accounting processing.

A terminal according to a second aspect of the present disclosure
  receives, in a table used by a customer, an order for a product from the customer and then transmits table identification information by which the table can be identified and product information regarding the product to a server via a network, and
  acquires, when the terminal is connected to a connection apparatus at the time of accounting, accounting information in which the table identification information and the product information are associated with each other from the server and then conducts accounting processing.

In an information processing method according to a third aspect of the present disclosure,
  a terminal receives, in a table used by a customer, an order for a product from the customer and then transmits table identification information by which the table can be identified and product information regarding the product to a server via a network, and
  when the terminal is connected to a connection apparatus at the time of accounting, the terminal acquires accounting information in which the table identification information and the product information are associated with each other from the server and then conducts accounting processing.

A non-transitory computer readable medium according to a fourth aspect of the present disclosure stores a program for causing a computer to execute an information processing method, in which
  in a table used by a customer, an order for a product is received from the customer and table identification information by which the table can be identified and product information regarding the product are transmitted to a server via a network, and
  when the terminal is connected to a connection apparatus at the time of accounting, accounting information in which the table identification information and the product information are associated with each other is acquired from the server and then accounting processing is conducted.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 9 is a diagram showing one example of customer information according to the second example embodiment;

FIG. 10 is a diagram showing one example of order information stored in a terminal according to the second example embodiment;

FIG. 11 is a diagram showing one example of PLU information according to the second example embodiment;

FIG. 12 is a diagram showing one example of order information stored in a server according to the second example embodiment;

FIG. 13A is a diagram showing one example of change machine information according to the second example embodiment;

FIG. 13B is a diagram showing one example of change machine information according to the second example embodiment;

FIG. 14 is a diagram showing one example of accounting information according to the second example embodiment;

FIG. 15 is a diagram showing one example of receipt output information according to the second example embodiment;

FIG. 16 is a diagram showing one example of a display screen output to a display according to the second example embodiment;

FIG. 17 is one example of attachment information stored in an accounting cradle according to the second example embodiment;

EMBODIMENTS

Hereinafter, with reference to the drawings, example embodiments of the present disclosure will be described. Throughout the drawings, the same or corresponding components are denoted by the same reference symbols and overlapping descriptions will be omitted as necessary for the sake of clarification of the description.

First Example Embodiment

Figure 1:
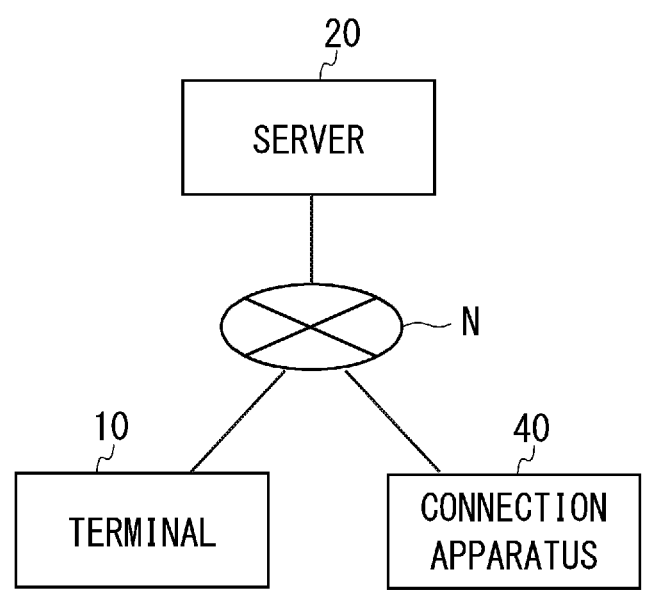
FIG. 1 is a block diagram showing a configuration of an accounting system according to a first example embodiment.

FIG. 1 is a block diagram showing a configuration of an accounting system 1 according to this example embodiment.

The accounting system 1 includes a terminal 10, a server 20, and a connection apparatus 40. The terminal 10 is placed on a table that a customer uses. The connection apparatus 40 is connected to the terminal 10 at the time of accounting. The server 20 communicates with the terminal 10 and the connection apparatus 40 via a network N.

The terminal 10 receives an order for a product from a customer and then transmits table identification information by which the table can be identified and product information regarding the product to the server 20. The server 20 stores the table identification information and the product information in association with each other as accounting information. The terminal 10 acquires, after it is connected to the connection apparatus 40, the accounting information associated with the table identification information from the server 20 and performs accounting processing.

As described above, with the accounting system 1 according to this example embodiment, the customer connects the terminal 10 to the connection apparatus 40 at the time of accounting, whereby the terminal 10 is able to acquire the accounting information from the server 20 based on the table identification information and thus perform the accounting processing. Therefore, in the accounting system 1, it is possible to enable customers to pay bills more efficiently.

Second Example Embodiment

Figure 2:
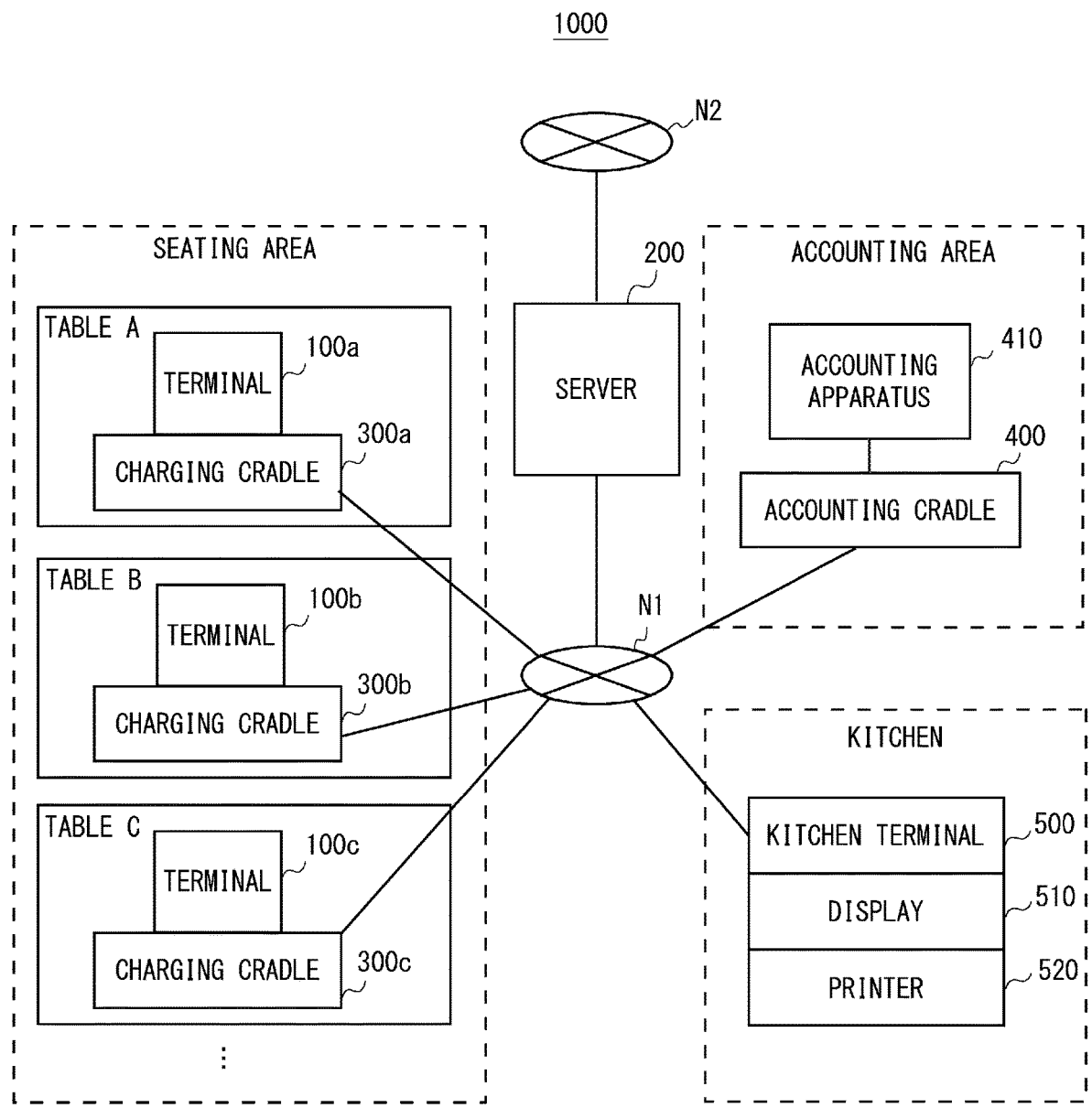
FIG. 2 is a block diagram showing a configuration of an accounting system according to a second example embodiment.

A second example embodiment is a specific example of the aforementioned first example embodiment. FIG. 2 is a block diagram showing a configuration of an accounting system 1000 according to this example embodiment. The accounting system 1000 is one example of the aforementioned accounting system 1.

The accounting system 1000 is an information processing system in which information terminals or the like disposed in a store perform communication via a network N1 and predetermined order processing and accounting processing are conducted. The network N1 is a wired or wireless communication line. The accounting system 1000 may be used in, for example, but not limited to, an eating place such as a restaurant or a pub. In this example embodiment, a description will be given taking an example in which the accounting system 1000 is implemented in a restaurant.

As shown in FIG. 2, in this example embodiment, the store includes each of a seating area, a kitchen, and an accounting area. In the seating area, a plurality of tables are arranged. While a description will be given using a case in which tables A-C are disposed as one example in this example embodiment, the number of tables may be set as desired.

First, an overview of the accounting system 1000 will be described and then details of each of the components will be described later.

Terminals 100a-100c are disposed in the respective tables A-C. The terminals 100a-100c are, for example, information terminals such as tablet terminals. The terminals 100a-100c accept operations by customers when the customers place orders and pay bills and perform predetermined processing. Charging cradles 300a-300c are connection apparatuses on which the terminals 100a-100c are placed so that the terminals can be connected to the charging cradles 300a-300c. The terminals 100a-100c are placed on the charging cradles 300a-300c while the customers are not using them so that the terminals 100a-100c can be charged.

The charging cradles 300a-300c are connected to the network N1 by wired connection. The terminals 100a-100c are connected to the network N1 via the charging cradles 300a-300c. Alternatively, the terminals 100a-100c may be connected to the network N1 by wireless connection.

Figure 6:
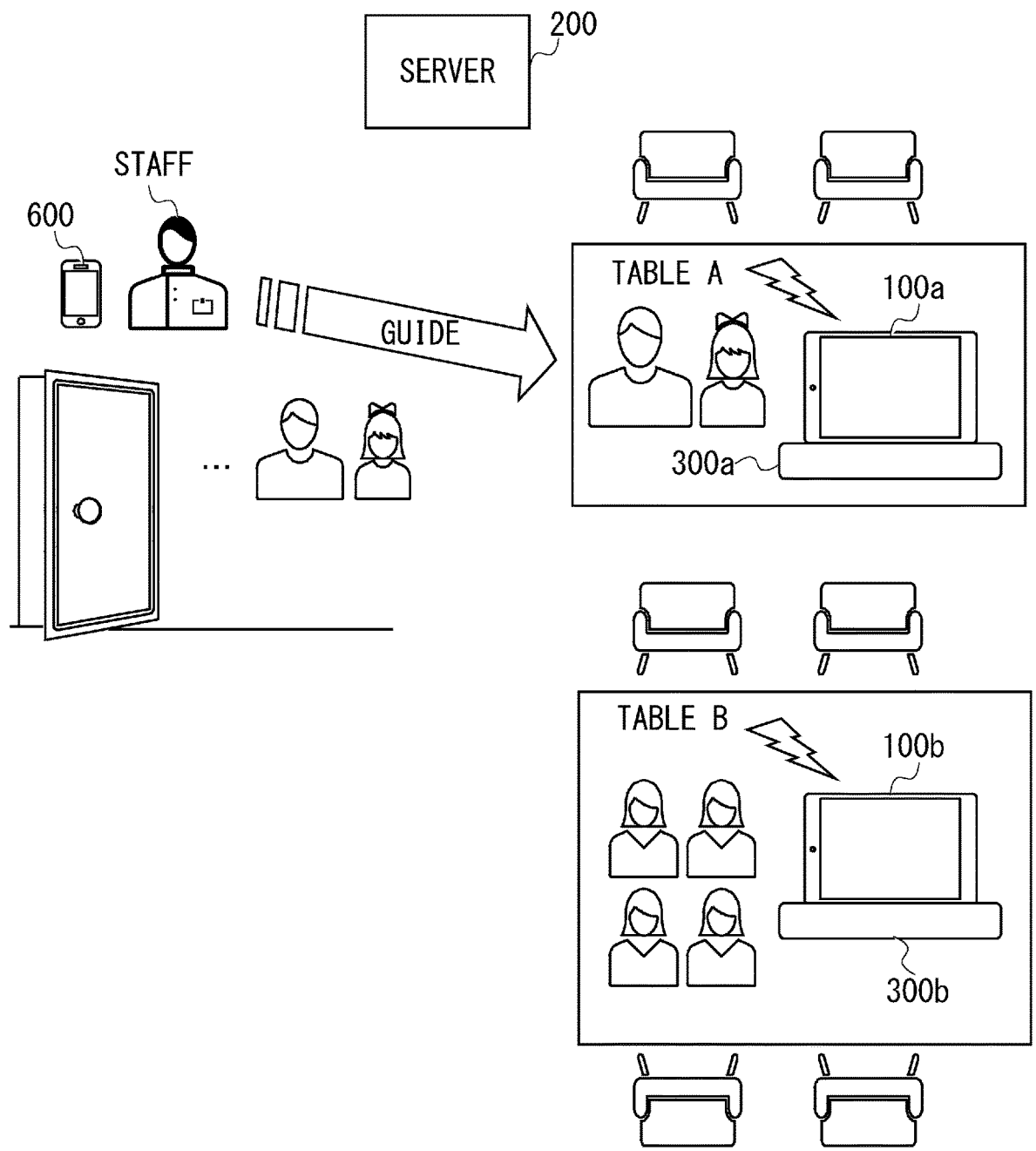
FIG. 6 is a diagram showing a flow of processing when customers are shown to their seats according to the second example embodiment.

Referring now to FIG. 6, a flow when customers who have come to a store are shown to their seats will be described. FIG. 6 is a diagram showing a flow of processing when customers are shown to their seats. When the customers come to the store, staff shows them to their tables. Each of the customers is shown to one of the tables A to C by the staff and is seated. In the example shown in FIG. 6, two customers are shown to the table A and four customers are shown to the table B.

The staff inputs customer information regarding customers shown to their seats using a staff terminal 600. The staff terminal 600 is, for example, an information terminal that can communicate with the network N1 wirelessly.

FIG. 9 is a diagram showing one example of the customer information. As shown in FIG. 9, the customer information is, for example, information including the number of customers, characteristics of the customers, and the table number. The staff terminal 600 transmits the customer information to a server 200. Accordingly, the server 200 is able to manage the customer information along with order information 292 and accounting information 294 that will be described later. Note that the number of persons, the characteristics of the customers and the like may be input by customers using the terminals 100*a*-100*c*.

Referring once again to FIG. 2, the descriptions will be continued.

The server 200 is connected to the network N1 by a wire or wirelessly and stores product information regarding the products transmitted from the terminals 100*a*-100*c* and the table identification information by which the table can be identified in association with each other as order information. Accordingly, the order information from customers are accumulated in the server 200 for each table. The server 200 transmits, upon receiving the order information, the order information to a kitchen terminal 500 disposed in the kitchen.

The kitchen terminal 500, a display 510, and a printer 520 are disposed in the kitchen. The kitchen terminal 500 is, for example, a Personal Computer (PC). The kitchen terminal 500 is connected to the network N1 by a wire or wirelessly.

Figure 7:
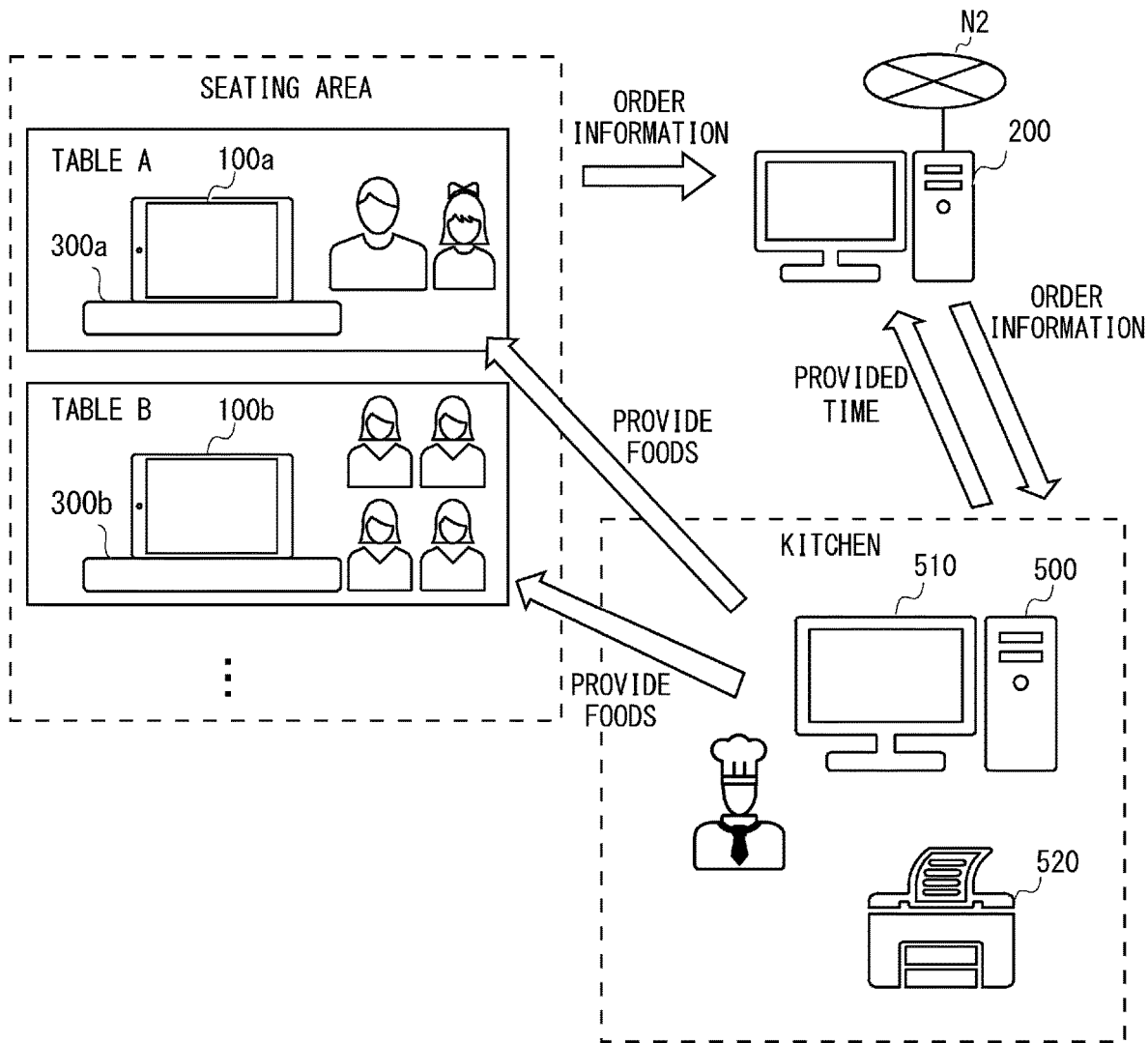
FIG. 7 is a diagram showing a flow of processing when products are ordered according to the second example embodiment.

Referring now to FIG. 7, a flow of processing when products are ordered will be described. FIG. 7 is a diagram showing a flow of processing when products are ordered.

The customers in the table A place orders for products using the terminal 100*a* disposed in the table A. Likewise, the customers in the table B place orders for products using the terminal 100*b* disposed in the table B. The terminals 100*a* and 100*b* each display the menu on a display screen of each terminal and receive orders from the customers. The terminals 100*a* and 100*b* each transmit the order information regarding the orders to the server 200. The order information includes information such as the table number, which is the table identification information, the product name and the like.

The server 200 transmits the order information to the kitchen terminal 500. The kitchen terminal 500 receives the order information from the server 200 and outputs the order information to the display 510 or the printer 520. Accordingly, staff in the kitchen is able to know order details from the customers using the display 510 or a paper output from the printer 520 and to provide food and so on for each of the tables.

After the staff in the kitchen completes providing the products, he/she enters information indicating that the products have been provided into the kitchen terminal 500. The kitchen terminal 500 transmits the information indicating that the products have been provided to the server 200 along with the time when they were provided. Accordingly, the server 200 can update the status of each of the ordered products regarding whether or not they have been provided.

Referring once again to FIG. 2, the descriptions will be continued.

An accounting cradle 400 and an accounting apparatus 410 are disposed in the accounting area. The accounting cradle 400 is a connection apparatus to which each of the terminals 100*a*-100*c* can be connected by placing the terminals 100*a*-100*c* on the accounting cradle 400. The accounting apparatus 410 may include a plurality of apparatuses such as automatic change machines for performing accounting processing. The accounting cradle 400 and the accounting apparatus 410 are connected to each other by a wire or wirelessly.

The accounting cradle 400 is connected to the network N1 by wired connection. The terminals 100*a*-100*c* are placed on the accounting cradle 400 so that the terminals 100*a*-100*c* can be connected to the network N1 via the accounting cradle 400. Alternatively, in the accounting area as well, the terminals 100*a*-100*c* may be connected to the network N1 by wireless connection.

Figure 8:
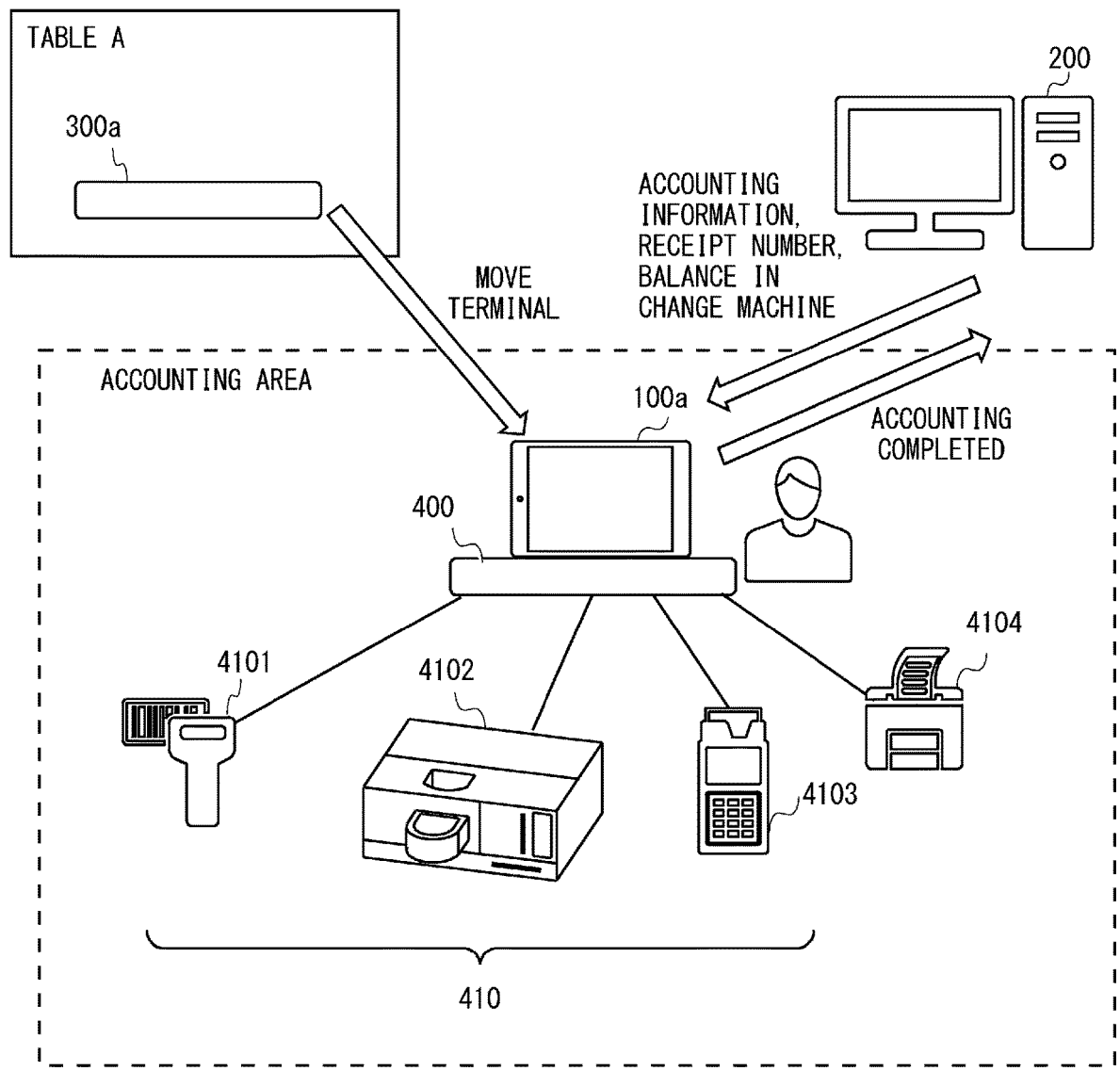
FIG. 8 is a diagram showing a flow of processing at the time of accounting according to the second example embodiment.

Referring now to FIG. 8, a flow of processing at the time of accounting will be described. FIG. 8 is a diagram showing a flow of the processing at the time of accounting. While FIG. 8 shows only the terminal 100*a* and the table A, the same is applicable to the other terminals and tables. In the following, the description will be given using the terminal 100*a*.

After the customer in the table A finishes using the seating area, the customer removes the terminal 100*a* from the charging cradle 300*a* and brings the terminal 100*a* to the accounting area. The customer then places the terminal 100*a* onto the accounting cradle 400.

After the terminal 100*a* is attached to the accounting cradle 400, a predetermined application for accounting is automatically started. The terminal 100*a* acquires, based on the table identification information on the table on which the terminal 100*a* is placed, accounting information regarding accounting of food and the like ordered in the table from the server 200. The terminal 100*a* acquires the receipt number printed on a receipt or information regarding the balance in the change machine regarding the change from the server 200.

The terminal 100*a* causes, for example, the display screen included in the terminal 100*a* to display the order details and the amount of the bills and notifies the customer of the amount of the bills. The customer makes payment using the accounting apparatus 410. As shown in FIG. 8, the accounting apparatus 410 includes a plurality of apparatuses that correspond to a plurality of accounting methods. The accounting apparatus 410 includes, for example, a barcode reader 4101, an automatic change machine 4102, or a credit card reader 4103. The accounting cradle 400 outputs results of the accounting processing to a printer 4104 as a receipt. Each of the accounting methods will be described later.

After the accounting processing is completed, the terminal 100*a* transmits information indicating that the accounting processing has completed to the server 200. The server 200 receives the information indicating that the accounting processing has completed from the terminal 100*a*.

As described above, in this example embodiment, customers are able to perform the processing from ordering to accounting in a store without the need for the help of staff. Note that the server 200 may transmit the order information or the accounting information to a terminal or the like outside the store via a network N2. When the store is a chain store or the like, these information items may be transmitted to a server at a headquarters which manages each of the stores, whereby sales and the like may be managed by the server at the headquarters.

Next, each of the components of the accounting system 1000 shown in FIG. 2 will be described in detail.

First, the terminals 100*a*-100*c* disposed in the seating area shown in FIG. 2 will be described. Each of the terminals 100*a*-100*c* is one example of the terminal 10 according to the first example embodiment. The terminals 100*a*-100*c* are disposed in the respective tables A-C that customers use in such a way that the terminals 100a-100c are placed on the charging cradles 300a-300c. Each of the terminals 100a-100c may be, for example, an information terminal such as a tablet terminal, a smartphone, or a mobile telephone terminal. In this example embodiment, a description will be given assuming that the terminals 100a-100c are tablet terminals.

The terminals 100a-100c are connected to the network N1 by a wire or wirelessly. The network N1 is one example of the network N in the first example embodiment. The network N1 may be, for example, a Local Area Network (LAN).

Figure 3:
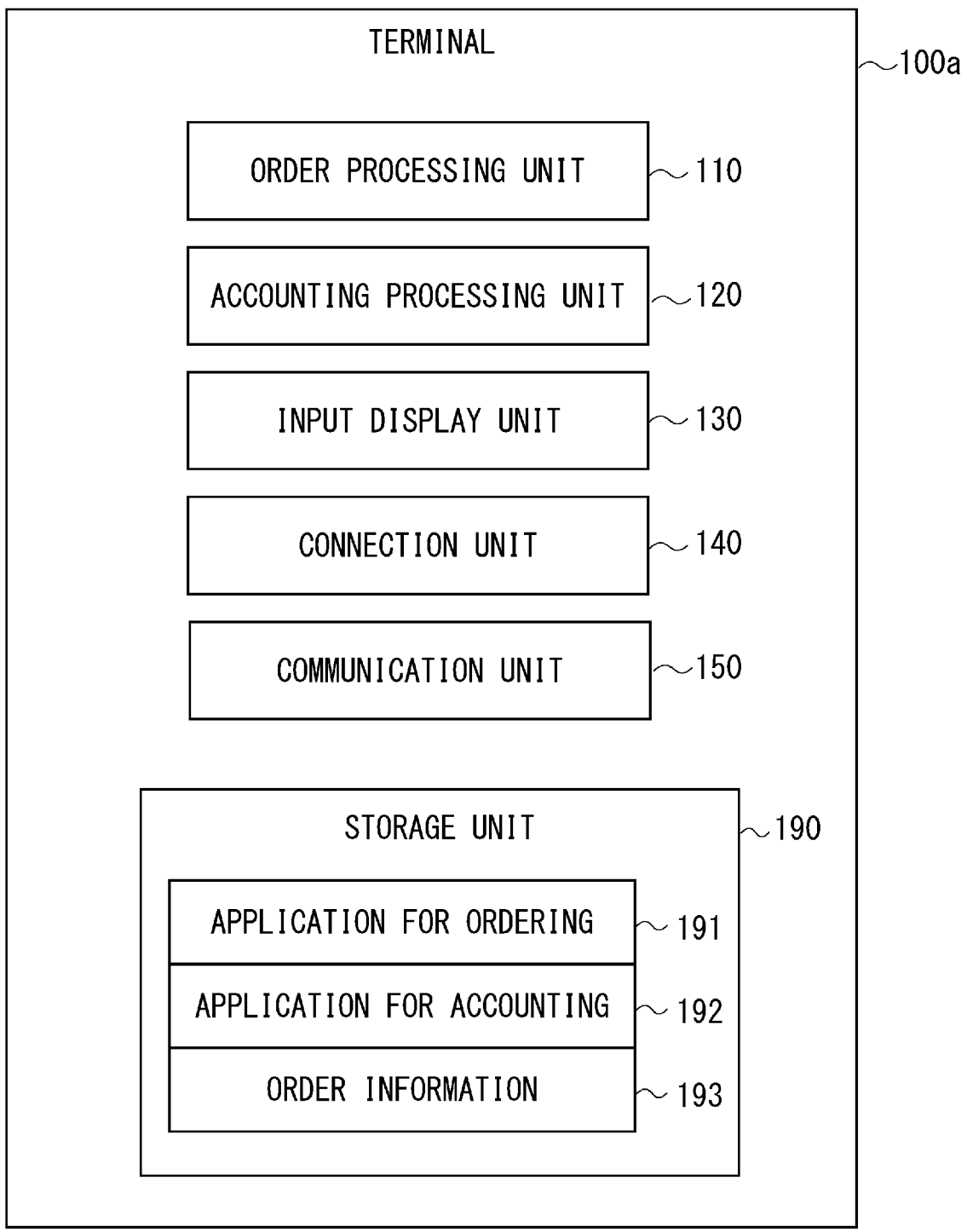
FIG. 3 is a block diagram showing a configuration of a terminal according to the second example embodiment.

Referring to FIG. 3, a configuration of the terminals 100a-100c will be described. FIG. 3 is a block diagram showing a configuration of the terminal 100a. Since the configurations of the terminals 100a-100c are the same, specific configurations of the terminals 100a-100c will be described using the terminal 100a. As shown in FIG. 3, the terminal 100a includes an order processing unit 110, an accounting processing unit 120, an input display unit 130, a connection unit 140, a communication unit 150, and a storage unit 190.

The order processing unit 110 starts an application for ordering 191 stored in the storage unit 190 and performs processing regarding an order for a product. The order processing unit 110 starts, when the terminal 100a is not attached to the accounting cradle 400, the application for ordering 191 and receives the order for the product from the customer. The order processing unit 110 may start the application for ordering 191 upon accepting the operations by the staff or the customer.

The order processing unit 110 causes the input display unit 130 to display a menu screen including the information regarding the product. The menu screen may include, for example, the product name, the image of the product, the price of the product, or the description on the product. The customer selects a desired product by touching the desired product from the input display unit 130, touches, for example, a button "place an order" displayed on the input display unit 130, and thus places an order for the product.

Upon receiving the order for the product in accordance with the operation for ordering from the customer, the order processing unit 110 stores the table identification information and the product information in association with each other in the storage unit 190 as order information 193. Further, the order processing unit 110 transmits the order information 193 to the server 200.

The table identification information is information for identifying the table. In this example embodiment, the description will be given using the table number given for each table as the table identification information. The table number may be stored in the terminal 100a in advance or the computer name of the terminal 100a may be set so as to include the table number. Alternatively, when the terminal 100a and the table A are managed in association with each other in the server 200, terminal identification information for identifying the terminal may be transmitted in place of the table identification information. The table identification information may be any kinds of information as long as it identifies the table.

The product information is information regarding the ordered product. The product information may include product identification information for identifying the ordered product and information on the number of products ordered. The product identification information may be the above-mentioned product name or a product code or the like for identifying the product.

For example, the order processing unit 110 transmits the order information 193 in which the table number, the product code, and the number of products ordered are associated with one another to the server 200. Therefore, the terminal 100a transmits, for example, the order information 193 including "table A" as the table number, "001" as the product code, and "1" as the number of products ordered to the server 200 via the network N1. The order processing unit 110 transmits the order information 193 to the server 200 every time it receives an order from a customer.

When the terminal 100a and the table number are managed in association with each other in the server 200, the table number may not be transmitted. In this case, it is specified in the server 200 that the terminal to which the product information has been transmitted is the terminal 100a based on the computer name of the terminal 100a. The information used here is not limited to the computer name and any kinds of information for identifying the terminal 100a may be used.

The accounting processing unit 120 starts an application for accounting 192 stored in the storage unit 190 and performs processing regarding accounting of the product.

When the terminal 100a is connected to the accounting cradle 400, the accounting processing unit 120 automatically starts the application for accounting 192. Now, one example of the method for starting the application for accounting 192 will be described. As will be described later, the accounting cradle 400 stores "autorun.inf" for enabling the terminal 100a to automatically execute the application for accounting 192.

After the terminal 100a is connected to the accounting cradle 400 via the connection unit 140, the terminal 100a recognizes the accounting cradle 400 as a USB storage device. The accounting processing unit 120 reads out "autorun.inf" stored in the accounting cradle 400, reads out the application for accounting 192 specified by "autorun.inf", and starts the application for accounting 192.

After the terminal 100a thus detects the connection with the accounting cradle 400, the accounting processing unit 120 automatically starts the application for accounting 192. The method for starting the application for accounting 192 is not limited to the aforementioned method. The accounting processing unit 120 may be configured to start the application for accounting 192 by a desired method.

After the accounting processing unit 120 starts the application for accounting 192, it requests the server 200 to transmit the accounting information 294. Information on the table number that corresponds to the terminal 100a is added to the request. Accordingly, the accounting processing unit 120 is able to request the server 200 for the accounting information 294 associated with the table number.

Upon acquiring the accounting information 294 associated with the table number from the server 200, the accounting processing unit 120 executes the application for accounting 192 and thus performs the accounting processing regarding the product that the customer has ordered. The accounting processing unit 120 causes, for example, the input display unit 130 to display the accounting information 294 regarding the table A, to thereby notify the customer in the table A of the price of the product. The accounting processing unit 120 may provide audio guidance to customers using voice by outputting voice to a speaker or the like (not shown).

Further, the accounting processing unit 120 is able to accept the input by the customer and perform accounting processing using the accounting method selected from a plurality of accounting methods. The accounting methods include, for example, but not limited to, cash, a credit card, electronic money, barcode, or Near Field Communication (NFC). After the accounting processing unit 120 receives the selection of the accounting method, the accounting processing unit 120 outputs the accounting information 294 to the accounting apparatus 410 and performs the accounting processing in accordance with the selected accounting method.

The input display unit 130 has a function as an input unit that accepts input from users and a display unit that displays characters, images, or the like. The input display unit 130 may be, for example, a touch panel that enables a customer to input information by touching it with a finger, a stylus pen or the like. At the time of placing an order, the input display unit 130 displays the menu screen of food, beverages, or the like, and receives input of orders in accordance with the touch operation by the customers. Further, the input display unit 130 displays, at the time of accounting, the amount of the bills and the accounting method accepts input of the accounting method and the like in accordance with the touch operation performed by the customer.

The connection unit 140 is an interface for connecting the terminal 100a to other devices. In this example embodiment, the other devices are the charging cradles 300a-300c or the accounting cradle 400. The connection unit 140 is configured to include terminals for connecting the charging cradles 300a-300c or the accounting cradle 400 and the terminal 100a by, for example, Universal Serial Bus (USB) connection. The connection unit 140 may perform connection with these devices by a method other than USB.

When the terminal 100a is electrically connected to the charging cradle 300a via the connection unit 140, the terminal 100a is supplied with power via the charging cradle 300a. Accordingly, the terminal 100a can be charged. Further, after the terminal 100a is electrically connected to the accounting cradle 400 via the connection unit 140, the terminal 100a starts the application for accounting 192 in accordance with "autorun.inf" stored in the accounting cradle 400. The terminal 100a may be configured to start the application for ordering 191 when it is not connected to the accounting cradle 400.

The communication unit 150 is a communication interface with the network N1. The communication unit 150 may include, for example, a desired apparatus that enables near-field communication such as Wi-Fi (registered trademark) or Bluetooth (registered trademark). Further, the communication unit 150 may communicate with the network N1 by wired connection via the charging cradle 300a or the accounting cradle 400.

The storage unit 190 stores the application for ordering 191, the application for accounting 192, and the order information 193.

The application for ordering 191 and the application for accounting 192 are applications for performing the order processing and the accounting processing, respectively. The application for ordering 191 and the application for accounting 192 are installed in the terminal 100a in advance. The order information 193 manages information on the product ordered in the terminal 100a. FIG. 10 is a diagram showing one example of the order information 193. As shown in FIG. 10, the order information 193 is information in which the order number, the table number, the number of persons, the ordered product, and the order time are associated with one another. While the order information 193 is accumulated every time an order from a customer is received, the order information 193 may be deleted from the terminal 100a at a predetermined timing. For example, the order information 193 may be configured to be deleted from the terminal 100a when a predetermined period of time has passed after the order information 193 is transmitted to the server 200 or the accounting that corresponds to the order information 193 is completed.

Next, a configuration of the server 200 shown in FIG. 2 will be described. The server 200 is one example of the server 20 according to the first example embodiment. The server 200 is connected to the terminals 100a-100c, the charging cradles 300a-300c, the accounting cradle 400, the accounting apparatus 410, and the kitchen terminal 500 by a wire or wirelessly via the network N1 and communicates with one another. The server 200 is further connected to a terminal or the like outside the store via the network N2 and performs communication. The network N2 may be, for example, a Wide Area Network (WAN) such as the Internet.

Figure 4:
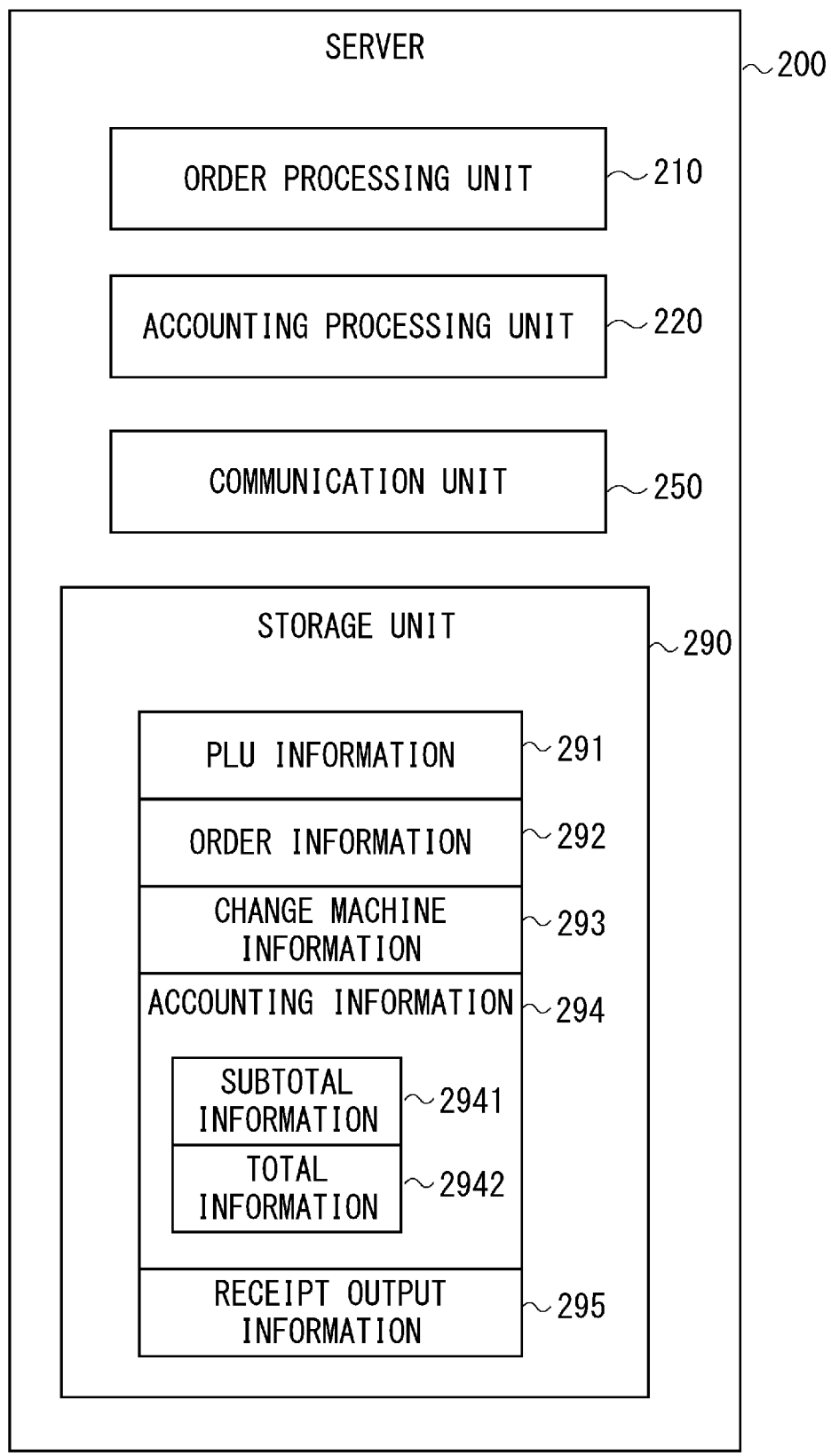
FIG. 4 is a block diagram showing a configuration of a server according to the second example embodiment.

FIG. 4 is a block diagram showing a configuration of the server 200.

The server 200 includes an order processing unit 210, an accounting processing unit 220, a communication unit 250, and a storage unit 290.

The order processing unit 210 performs processing regarding orders. The order processing unit 210 acquires the order information 193 from the terminals 100a-100c. The order processing unit 210 accumulates the order information 193 of each table and stores them as the order information 292.

FIG. 12 is a diagram showing one example of the order information 292. The order information 292 is, for example, information in which the order number, the table number, the number of persons, the ordered product, and the order time are associated with one another. The order processing unit 210 stores the table number in association with the product information, whereby the order processing unit 210 is able to calculate the amount of the bills for each table.

Referring once again to FIG. 4, the descriptions will be continued.

The order processing unit 210 transmits the order information 292 to the kitchen terminal 500 and causes the display 510 and the printer 520 in the kitchen to output the order information 292. The order processing unit 210 further manages whether or not the product has already been provided in accordance with the input from the kitchen terminal 500.

The accounting processing unit 220 creates the accounting information 294 based on the order information 292 acquired in the order processing unit 210 and stores the created accounting information 294 in the storage unit 290. The accounting processing unit 220 performs processing regarding accounting of each table using the accounting information 294. Further, the accounting processing unit 220 updates the contents of the accounting information 294 in accordance with the progress of the accounting processing.

Referring now to FIG. 14, processing performed by the accounting processing unit 220 will be described. FIG. 14 is a diagram showing one example of the accounting information 294. The accounting information 294 includes subtotal information 2941 and total information 2942. The subtotal information 2941 is information indicating the subtotal for each order and the total information 2942 is information indicating the total price of the orders for each table.

As shown in FIG. 14, the subtotal information 2941 is information in which, for example, an accounting flag, the table number, the ordered product, and the price are associated with one another. The accounting flag is information indicating whether or not the account has been settled. At the time of placing an order, the account has not been settled. In this case, the accounting processing unit 220 sets the accounting flag of each order to "not yet".

The table number and the ordered product correspond to the table number and the ordered product in the order information 292.

The price is the price that corresponds to each product. The accounting processing unit 220 refers to Price Look Up (PLU) information 291 and acquires the price associated with the ordered product. While the product name is used as an ordered product in FIG. 14, a product code or the like may be used in place of the product name. Further, while not shown in FIG. 14, the subtotal in accordance with the number of products ordered may be calculated by multiplying the number for each product by the price.

Further, as shown in FIG. 14, the total information 2942 is, for example, information in which the receipt number, the accounting time, the table number, the number of persons, the total price, the accounting method, and the accounting flag are associated with one another.

The receipt number is the number given to a receipt issued for the customer.

The accounting time is information indicating the date and time when the accounting processing has been performed.

The table number and the number of persons correspond to the table number and the number of persons in the order information 292.

The total price indicates the total price of the ordered product. The total price is a total price included in the subtotal information 2941 for each table.

The accounting method is an accounting method selected by the customer. The accounting method can be selected, for example, from cash, a credit card and the like.

The accounting flag corresponds to the accounting flag of the subtotal information 2941.

Referring once again to FIG. 4, the descriptions will be continued.

The accounting processing unit 220 sends back the accounting information 294 in association with the table on which each terminal is placed in response to the request from the terminals 100a-100c. After the accounting is completed, the accounting processing unit 220 changes the accounting flag of the accounting information 294 from "not yet" to "done".

The accounting processing unit 220 may transmit the accounting information 294 to a terminal or the like outside the store via the network N2. Accordingly, when the store is a chain store or the like, these information items may be transmitted to the server at a headquarters which manages each of the stores, whereby sales and the like may be managed by the server at the headquarters. Like in the accounting processing unit 220, the order processing unit 210 may transmit the order information 292 to a terminal outside the store.

The communication unit 250 is a communication interface with the networks N1 and N2. The communication unit 250 connects the networks N1 and N2, and the server 200 wirelessly or by a wire.

The storage unit 290 stores PLU information 291, order information 292, change machine information 293, accounting information 294, and receipt output information 295.

The PLU information 291 manages information on products. FIG. 11 is a diagram showing one example of the PLU information 291. As shown in FIG. 11, the PLU information 291 is, for example, information in which the product code for identifying the product, the product name, the price of the product and the like are associated with one another.

Referring once again to FIG. 4, the descriptions will be continued.

The order information 292 is information in which the table number and the product information are associated with each other. Since the order information 292 has already been described with reference to FIG. 12, the description thereof will be omitted here.

The change machine information 293 is information for managing the change in the automatic change machine 4102. FIGS. 13A and 13B are diagrams showing one example of the change machine information 293. FIG. 13A shows information indicating how much change is available in a plurality of items of change machine information 293. In the change machine information 293, for example, the change machine number, the date, the receipt number in cash accounting, and the balance in the change machine are associated with one another. Further, FIG. 13B is one example of information for managing the number of coins and the like in the automatic change machine 4102.

Referring once again to FIG. 4, the descriptions will be continued.

The accounting information 294 is information regarding accounting. Since the accounting information 294 has already been described with reference to FIG. 14, the description thereof will be omitted here.

The receipt output information 295 is information regarding the content to be output to a receipt issued for the customer. FIG. 15 is a diagram showing one example of the receipt output information 295. The receipt output information 295 is, for example, information in which the receipt number, the table number, the number of persons, the order time, the accounting time, order details including the price, and the accounting method are associated with one another. Since the contents of each of the elements duplicate those already described above, the detailed descriptions thereof will be omitted.

Next, the kitchen shown in FIG. 2 will be described.

The kitchen terminal 500, the display 510, and the printer 520 are disposed in the kitchen. The kitchen terminal 500 is an information terminal such as a PC. The kitchen terminal 500 receives the order information 292 from the server 200 and outputs the received order information 292 to the display 510 and the printer 520.

FIG. 16 is a diagram showing one example of a display screen 510a output to the display 510. As shown in FIG. 16, the kitchen terminal 500 stores the order number, the table number, the product name, and the time when the product has been provided in association with one another and outputs them to the display 510 as the display screen 510a. The kitchen terminal 500 may output the similar content to a paper from the printer 520. The staff in the kitchen can know what has been ordered and whether or not the ordered product has been provided by viewing the display 510 or the paper output from the printer 520.

Further, the kitchen terminal 500 manages whether or not the ordered product has been provided. The kitchen terminal 500 receives input from an input apparatus (not shown) connected to the kitchen terminal 500, a staff terminal operated by the staff or the like and manages whether or not the ordered product has been provided. After the ordered product is provided, the kitchen terminal 500 enters the time when the product has been provided.

Next, the accounting area shown in FIG. 2 will be described.

The accounting cradle 400 and the accounting apparatus 410 are disposed in the accounting area. The accounting cradle 400 is one example of the connection apparatus 40 according to the first example embodiment. At the time of accounting, the customer places the terminal 100a on the accounting cradle 400. Accordingly, the terminal 100a and the accounting cradle 400 are connected to each other and the terminal 100a automatically starts the application for accounting 192. The customer is able to take accounting procedures in accordance with the processing performed by the application for accounting 192.

While the description has been given using the accounting cradle 400 of the cradle type as one example of the connection apparatus 40 in this example embodiment, the shape of the connection apparatus 40 is not limited to the cradle type. For example, a connection apparatus having a shape other than the cradle type may be used. Alternatively, the accounting cradle 400 and the terminal 100a may be connected to each other using a USB cable or the like. Further, while one accounting cradle 400 is shown in FIG. 2, a plurality of accounting cradles 400 may be provided in the accounting area.

Figure 5:
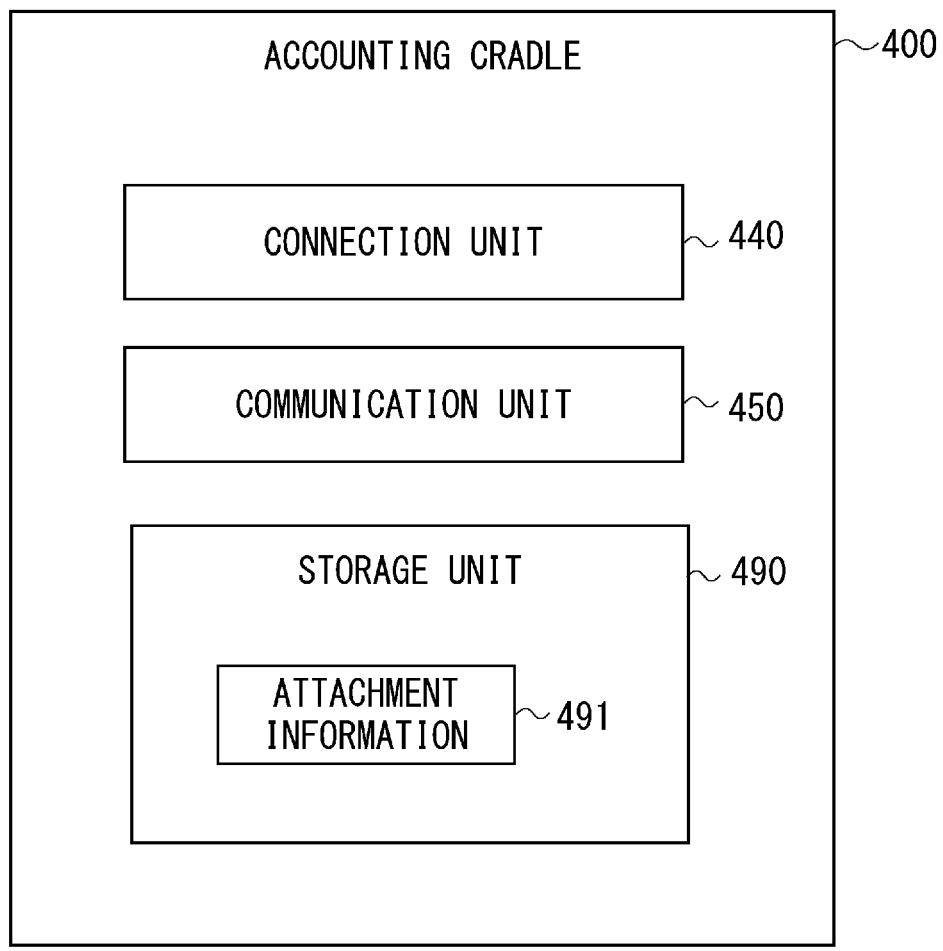
FIG. 5 is a block diagram showing a configuration of an accounting cradle according to the second example embodiment.

FIG. 5 is a block diagram showing a configuration of the accounting cradle 400. The accounting cradle 400 includes a connection unit 440, a communication unit 450, and a storage unit 490.

The connection unit 440 is an interface for connecting the accounting cradle 400 with other devices. In this example embodiment, the other devices are the terminals 100a-100c. In this example, the description will be given taking a case in which the terminal 100a is connected to the accounting cradle 400 as an example. The connection unit 440 is configured to include a terminal for connecting the accounting cradle 400 to the terminal 100a by, for example, USB connection. The connection method is not limited thereto and the connection unit 440 may be configured to be connected to the terminal 100a by a method other than USB.

The communication unit 450 is a communication interface with the network N1.

The storage unit 490 stores attachment information 491. The accounting cradle 400 detects that the terminal 100a has been attached to the accounting cradle 400 or that the terminal 100a has been removed from the accounting cradle 400 and thus updates the attachment information 491.

FIG. 17 is one example of the attachment information 491 that the accounting cradle 400 stores.

The attachment information 491 is, for example, information in which attachment or non-attachment, application used, accounting permission determination, accounting flag, and the table number are associated with one another.

Attachment or non-attachment is information indicating whether the terminal 100a is attached to the accounting cradle 400. The application used is information indicating an available application in accordance with whether or not the terminal 100a is attached to the accounting cradle 400. When, for example, the terminal 100a is attached to the accounting cradle 400, the accounting cradle 400 sets attachment or non-attachment to "attached". In this case, the terminal 100a is able to use the application for accounting, and the execution of the accounting processing may be permitted.

The accounting permission determination is information indicating whether to permit the accounting processing. For example, the accounting cradle 400 acquires the table number of the attached terminal 100a and transmits the acquired table number to the server 200, and requests the server 200 to check whether or not there is unaccounted order information 292 regarding the terminal 100a. When there is unaccounted order information 292 regarding the terminal 100a and the application for accounting 192 is started, the accounting cradle 400 permits the accounting processing regarding the terminal 100a. In this case, the accounting cradle 400 sets the accounting permission determination to "permitted".

The accounting flag is information indicating whether or not the account has been settled, like the one mentioned above. When the accounting processing has not been completed, the accounting flag is set to "not yet". When the accounting processing is completed, the accounting cradle 400 sets the accounting flag to "done".

After the terminal 100a is removed from the accounting cradle 400, the accounting cradle 400 sets attachment or non-attachment to "non-attachment". In this case, the application for accounting 192 is no longer available and the application for ordering 191 is available. Further, the accounting cradle 400 automatically sets the accounting flag to "not yet". Accordingly, the terminal 100a is ready to perform the order processing. Therefore, the staff or the like returns the terminal 100a where the accounting processing has been completed to the charging cradle 300a in the seating area so that the next customer can perform the order processing.

The accounting cradle 400 is able to acquire the table number of the table A associated with the terminal 100a from the computer name or the like of the terminal 100a when the accounting cradle 400 is connected to the terminal 100a. Further, the accounting cradle 400 may transmit the updated attachment information 491 to the server 200.

Referring once again to FIG. 5, the descriptions will be continued.

As described above, the storage unit 490 stores "autorun.inf" (not shown). "autorun.inf" is a file for automatically executing the application for accounting 192 stored in the terminal 100a when the terminal 100a is connected to the accounting cradle 400. After the accounting cradle 400 is connected to the terminal 100a, the application for accounting 192 specified by "autorun.inf" is started in the terminal 100a.

As shown in FIGS. 2 and 8, the accounting cradle 400 is connected to the accounting apparatus 410 that performs accounting processing. A customer places the terminal 100a onto the accounting cradle 400 so that the customer is able to perform accounting processing using the accounting apparatus 410 connected to the accounting cradle 400.

In the example shown in FIG. 8, the accounting apparatus 410 includes a barcode reader 4101, an automatic change machine 4102, and a credit card reader 4103. The customer is able to select a desired accounting method from the plurality of accounting methods and pay bills.

Referring now to FIG. 8, each of the apparatuses included in the accounting apparatus 410 will be described. The barcode reader 4101 is an accounting apparatus that is used for barcode payment. The barcode reader 4101 reads, for example, a barcode displayed on the terminal 100a or a mobile terminal or the like that the customer has. Accordingly, the customer is able to perform barcode payment. The type of the payment is not limited to the barcode payment and a QR code (registered trademark) or the like may be used.

The automatic change machine 4102 is an accounting apparatus that is used for cash payment. The automatic change machine 4102 receives bills or coins put by the customer and discharges bills or coins as change, thereby conducting the cash payment. After the cash payment is conducted, the automatic change machine 4102 updates the aforementioned change machine information 293. Accordingly, the administrator or the like of the system is able to know the situation in the change in the automatic change machine 4102, whereby it is possible to prevent shortage of the change.

The credit card reader 4103 is an accounting apparatus that is used for credit card payment. The customer can perform credit card payment by causing the credit card reader 4103 to read information in the credit card. The credit card reader 4103 may include an input unit for enabling a customer to enter the PIN number or the like. Alternatively, the customer may be caused to enter the PIN number or the like via the input display unit 130 of the terminal 100a.

Note that the aforementioned accounting method is merely one example and other accounting methods may be used. The accounting apparatus 410 may include an integrated circuit (IC) card reader/writer for making payment by electronic money, a gift certificate deposit machine for making payment by gift certificate, or the like. The accounting apparatus 410 may deal with various accounting methods by connecting the accounting apparatus 410 with various kinds of equipment that can be connected to the accounting cradle 400. Note that, regarding each apparatus included in the accounting apparatus 410, a plurality of apparatuses may be provided so as to correspond to the number of accounting cradles 400. Alternatively, one apparatus may be provided so as to correspond to a plurality of accounting cradles 400. Further, when, for example, the terminal 100a has a function such as a barcode reader 4101 or a credit card reader 4103, the barcode reader 4101 and the like may not be additionally provided. In this case, barcode payment or credit card payment may be conducted using the terminal 100a.

In the accounting processing, the terminal 100a displays the accounting method that the customer can select on the input display unit 130 and receives selection of the accounting method. For example, the terminal 100a causes the input display unit 130 to display a message like "insert cash." so that the customer inserts cash. The terminal 100a may provide voice guidance as well as screen display.

In related art described in Background Art, in a case in which a customer prefers to pay by cash, the customer cannot complete the accounting processing by himself/herself and the accounting processing requires an operation by staff. However, in this example embodiment, the accounting cradle 400 and the automatic change machine 4102 can be connected to each other, whereby the customer can conduct the accounting processing by himself/herself even in the case in which the customer chooses to pay by cash.

The printer 4104 shown in FIG. 8 is an output apparatus for issuing a receipt. After the accounting processing is completed, the printer 4104 prints a receipt including the receipt output information 295 described with reference to FIG. 15.

The configuration of the charging cradles 300a-300c may be similar to that of the accounting cradle 400 described with reference to FIG. 5 or may be simpler than that of the accounting cradle 400, although it is not shown in the drawings. The charging cradles 300a-300c are connected to the network N1 by wired connection. The charging cradles 300a-300c are connection apparatuses capable of charging the terminals 100a-100c by placing the terminals 100a-100c thereon. The charging cradles 300a-300c may not include the communication function and may include only the function of charging the terminals 100a-100c in the seating area. The accounting cradle 400 may include a charging function, like in the charging cradles 300a-300c.

Note that the configuration of the accounting system 1000 shown in FIG. 2 is merely one example and the accounting system 1000 may be configured using an apparatus or the like in which a plurality of configurations are integrated. For example, some of the functions of the terminals 100a-100c, the server 200, and the kitchen terminal 500 may be integrated in one apparatus. Alternatively, each function unit in the terminals 100a-100c, the server 200, and the kitchen terminal 500 may be processed in a distributed manner using a plurality of apparatuses or the like.

Figure 18:
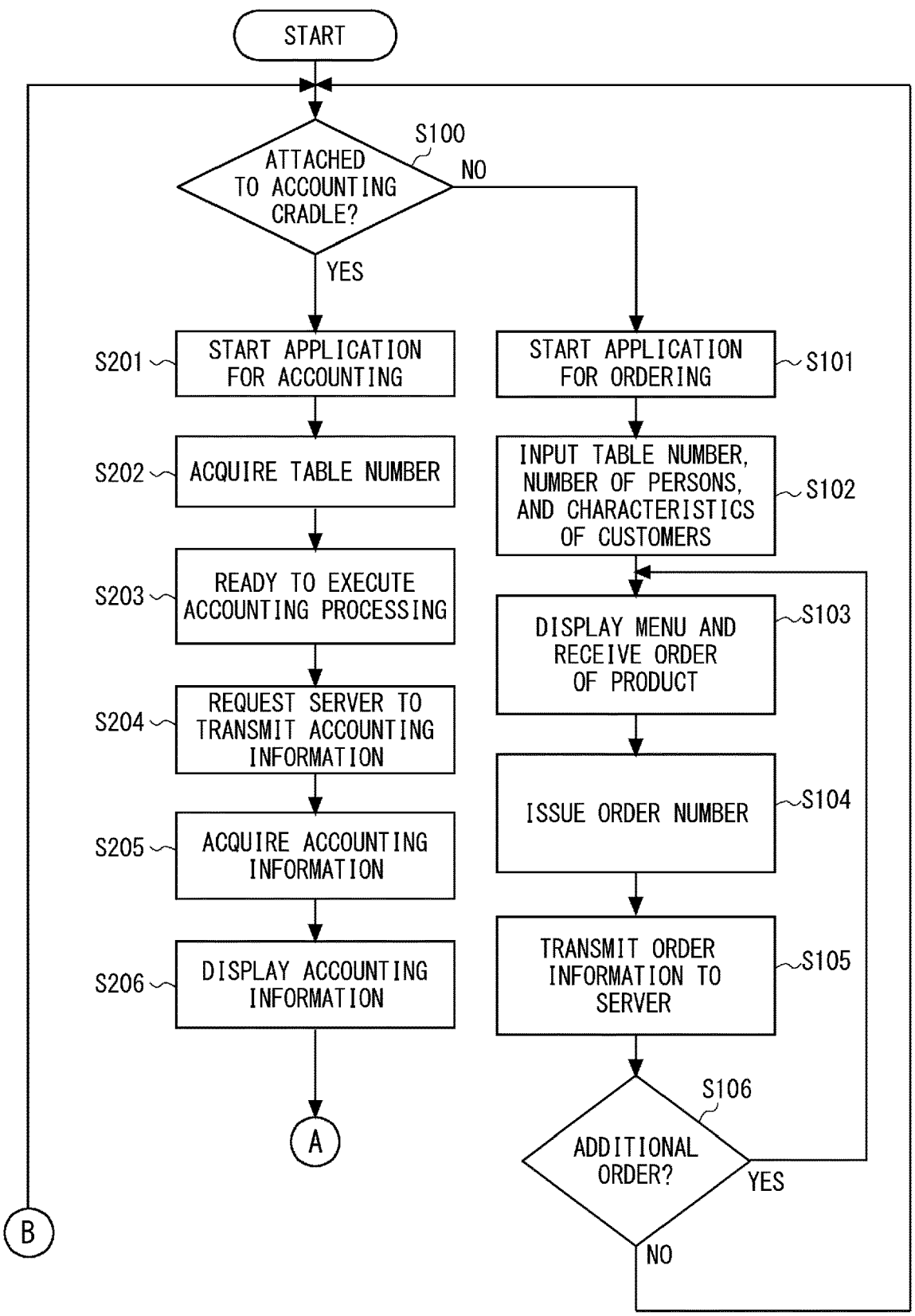
FIG. 18 is a flowchart showing order processing and accounting processing performed by a terminal according to the second example embodiment.
Figure 19:
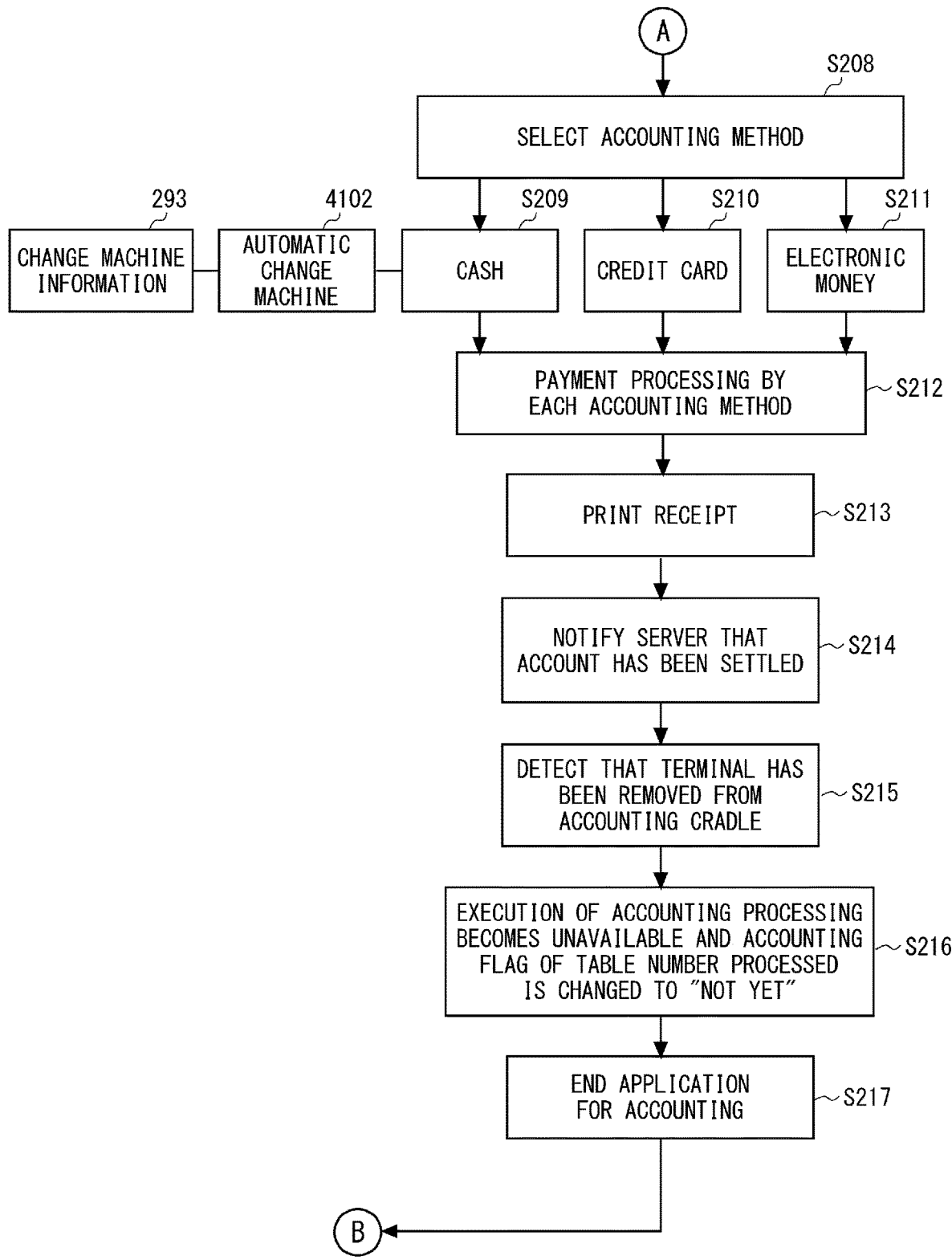
FIG. 19 is a flowchart showing the order processing and the accounting processing performed by the terminal according to the second example embodiment.

Referring next to FIGS. 18 and 19, processing performed by the terminals 100a-100c according to this example embodiment will be described. FIGS. 18 and 19 are flowcharts showing the order processing and the accounting processing performed by the terminals 100a-100c. Since the processing performed by the terminals 100a-100c are similar to each other, processing in the terminal 100a will be described here. Like in the aforementioned example, it is assumed that the terminal 100a is placed on the table A. In the following description, the description will be given using the terms used in FIGS. 2-17 as appropriate.

The terminal 100a determines whether or not the terminal 100a has been attached to the accounting cradle 400 (S100). When it is determined that the terminal 100a has been attached to the accounting cradle 400 (YES in S100), the process proceeds to the processing of Step S201. When it is not determined that the terminal 100a has been attached to the accounting cradle 400 (NO in S100), the process proceeds to the processing of Step S101.

First, processing when it is not determined that the terminal 100a has been attached to the accounting cradle 400 (NO in S100) will be described.

The order processing unit 110 starts the application for ordering 191 (S101). The order processing unit 110 may start the application for ordering 191 upon accepting an operation performed by a customer or may always start the application for ordering 191 while the application for accounting 192 is not started.

The order processing unit 110 receives input of the table number, the number of persons, and characteristics of the customers in accordance with the operation of the input display unit 130 from the customer using a finger or a pen (S102). Note that the order processing unit 110 may receive these information items via a staff terminal 600 used by staff. The order processing unit 110 transmits these information items to the server 200.

The order processing unit 110 displays the menu on the input display unit 130 and receives the order for the product from the customer (S103). The order processing unit 110 issues the order number (S104). The order number may be automatically assigned for each terminal. The order processing unit 110 transmits the order information 193 including the order number, the table number, the product information and the like to the server 200 (S105).

The server 200 receives the order information 193 from the terminal 100a and stores the received order information 193 in the storage unit 290 as the order information 292. Further, the server 200 transmits the order information 292 to the kitchen terminal 500. In the kitchen, the order information 292 is output to the display 510 and the printer 520. Accordingly, the staff in the kitchen knows the ordered products and provides the products for the customers. The kitchen terminal 500 transmits information on the product that has already been provided to the server 200. Accordingly, the server 200 is able to update the status of each of the ordered products regarding whether or not they have been provided.

The order processing unit 110 determines whether or not an additional order has been placed (S106). When the additional order has been placed (YES in S106), the process returns to Step S103 and the following processing is repeated. When the additional order has not been placed (NO in S106), the process returns to Step S100 and the following processing is repeated.

Next, processing when it is determined that the terminal 100a has been attached to the accounting cradle 400 (YES in S100) will be described. After a customer finishes using the seating area, the customer removes the terminal 100a from the charging cradle 300a, moves to the accounting area, and places the terminal 100a onto the accounting cradle 400. The accounting processing unit 120 starts the application for accounting 192 using a USB memory function that the accounting cradle 400 has (S201). The accounting cradle 400 stores, for example, "autorun.inf" for enabling the terminal 100a to automatically execute the application for accounting 192 in advance. After the terminal 100a is connected to the accounting cradle 400, the terminal 100a recognizes that the accounting cradle 400 as a USB device and reads out "autorun.inf". The terminal 100a loads the application for accounting 192 specified by "autorun.inf" from the storage unit 190 and starts the loaded application for accounting 192. The accounting processing unit 120 may automatically start the application for accounting 192 using a desired method other than the aforementioned method.

The accounting processing unit 120 acquires the table number of the table at which the terminal 100a has received an order from the terminal 100a (S202). The table number may be set so that it is included in, for example, the computer name of the terminal 100a or may be set by another method. If, for example, the computer name of the terminal 100a is set as "terminal for the table A", the accounting processing unit 120 acquires "table A" as the table number that corresponds to the terminal 100a.

After the connected terminal 100a is connected to the accounting cradle 400, the accounting cradle 400 determines whether or not to permit the accounting processing regarding the terminal 100a. For example, the accounting cradle 400 acquires the table number from the terminal 100a and requests the server 200 to check whether or not there is unaccounted order information 292 regarding the terminal 100a. Suppose, in this example, that the accounting cradle 400 has received a response indicating that there is unaccounted order information 292 regarding the terminal 100a. Further, since the terminal 100a is attached to the accounting cradle 400 and the application for accounting 192 is started, the accounting cradle 400 permits the accounting processing regarding the terminal 100a. Therefore, the accounting cradle 400 updates the accounting permission determination of the attachment information 491 to "permitted". Accordingly, the terminal 100a is able to execute the accounting processing (S203).

The accounting processing unit 120 requests the server 200 to transmit the unaccounted accounting information 294 along with the table number (S204). In the server 200, the accounting processing unit 220 refers to the subtotal information 2941 based on the table number. The accounting processing unit 220 refers to the PLU information 291 and acquires the price of each of the ordered products. The accounting processing unit 220 calculates the total price based on the subtotal information 2941 and acquires the total information 2942.

The server 200 transmits the accounting information 294 including the subtotal information 2941 and the total information 2942 to the terminal 100a.

The accounting processing unit 120 receives the accounting information 294 from the server 200 (S205). The accounting processing unit 120 displays, for example, the total price, a list of the ordered products, the accounting methods that may be selected and the like on the input display unit 130 and lets the customer to pay bills (S206).

Referring to FIG. 19, the descriptions will be continued.

The accounting processing unit 120 accepts the selection of the accounting method from the customer (S208). The customer is able to select a desired accounting method from a plurality of accounting methods that correspond to the accounting apparatus 410 connected to the accounting cradle 400. It is assumed here that the customer selects one of the automatic change machine 4102, the credit card reader 4103, and an IC card reader/writer and pay bills as one example of the accounting apparatus 410.

When cash has been selected as the accounting method (S209), the accounting processing unit 120 outputs the accounting information 294 to the automatic change machine 4102. The accounting processing unit 120 may cause the input display unit 130 to display, for example, a message like "Please put cash into the automatic change machine". The automatic change machine 4102 receives the bills or coins put by the customer and conducts cash payment (S212). The automatic change machine 4102 transmits information indicating, for example, an increase or a decrease in bills or coins to the server 200 and thus updates the change machine information 293.

When the credit card has been selected as the accounting method in Step S208 (S210), the accounting processing unit 120 outputs the accounting information 294 to the credit card reader 4103. The accounting processing unit 120 may cause the input display unit 130 to display, for example, a message like "Please insert your credit card into the card reader." After the customer inserts his/her credit card, the credit card reader 4103 conducts payment by the credit card (S212).

Further, when electronic money has been selected as the accounting method in Step S208 (S211), the accounting processing unit 120 outputs the accounting information 294 to the IC card reader/writer. The accounting processing unit 120 may cause the input display unit 130 to display, for example, a message like "Please hold your IC card over the IC card reader/writer." The IC card reader/writer detects that the IC card of the customer has come close to the IC card reader/writer, and thus conducts payment by the IC card (S212).

An accounting method other than those stated above may be selected depending on the type of an apparatus included in the accounting apparatus 410. For example, payment using an application in a mobile terminal or the like that the customer has may be conducted by reading a barcode by the barcode reader 4101.

After the payment by each accounting method is ended, the accounting processing unit 120 outputs a receipt from the printer 4104 (S213). The accounting processing unit 120 may acquire the receipt output information 295 from the server 200 and output the content of this information to a receipt paper or the like. The accounting processing unit 120 notifies the server 200 of information indicating that the accounting processing has completed (S214). The accounting processing unit 120 sends the above notification including, for example, information on the table number. Accordingly, the server 200 specifies the accounting information 294 where the accounting processing has been completed in the accounting processing unit 220. The accounting processing unit 220 changes the accounting flag of the accounting information 294 where the accounting processing has been completed from "not yet" to "done" and thus updates the accounting information 294.

The terminal 100a and the accounting cradle 400 detect that the terminal 100a has been removed from the accounting cradle 400 (S215). The accounting cradle 400 changes the accounting permission determination of the attachment information 491 from "permitted" to "not permitted". Accordingly, the terminal 100a can no longer execute the accounting processing (S216). The accounting cradle 400 further changes the accounting flag of the attachment information 491 from "done" to "not yet". Accordingly, the terminal 100a that has completed the accounting processing can be used for order processing by the next customer.

The accounting processing unit 120 ends the application for accounting 192 (S217). The terminal 100a returns to the processing of Step S100, and the following processing is repeated.

As described above, in the accounting system 1000 according to this example embodiment, the terminals 100a-100c are disposed in the plurality of respective tables that customers use. The terminals 100a-100c are able to receive the order for products from the customers and conduct order processing using the application for ordering 191. Further, at the time of accounting, the terminals 100a-100c are placed on the accounting cradles 400 by customers. The terminals 100a-100c automatically start the application for accounting 192 after the terminals 100a-100c are connected to the accounting cradle 400 by USB and perform the accounting processing.

The server 200 stores the order information 292 and the accounting information 294 in association with the table number and provides necessary information for the terminals 100a-100c in response to a request. For example, the server 200 transmits the accounting information 294 to the terminals 100a-100c at the time of accounting. Accordingly, the terminals 100a-100c are able to perform the accounting processing based on the accounting information 294 for each table number.

Since the accounting cradle 400 on which the terminals 100a-100c are placed is connected to the accounting apparatus 410 including the barcode reader 4101 or the automatic change machine 4102, the customer is able to select a desired accounting method from a plurality of accounting methods. Therefore, the customer can complete the accounting processing by himself/herself without the need for the help of staff.

Further, since the terminals 100a-100c are tablet terminals, they can be carried easily from the seating area to the accounting area. Customers place the terminals 100a-100c on the accounting cradle 400 so that the application for accounting 192 is automatically executed, which enables the customers to easily conduct the accounting processing without performing, for example, an operation of switching screens.

After the accounting processing is completed, the terminals 100a-100c are removed from the accounting cradle 400. At this time, the accounting flag is changed to "not yet" in the accounting cradle 400, whereby the terminals 100a-100c are automatically ready to receive the order processing by the next customers. Therefore, there is no need for customers or staff to manually switch the order processing and the accounting processing.

Further, in this example embodiment, the order processing and the accounting processing may be performed by one terminal, and thus there is no need to separately provide a terminal for ordering and a terminal for accounting. Further, the accounting apparatus 410 is disposed in the accounting area, which eliminates the need to provide a card reader or the like in each of the terminals 100a-100c. Therefore, the number of terminals and the number of accounting apparatuses that are connected to the terminals can be reduced in the whole store, whereby the cost can be reduced. Further, the order processing and the accounting processing may be performed in the terminals 100a-100c, which eliminates the need to create handwritten slips. Accordingly, it is possible to efficiently place orders and pay bills without error.

<Hardware Configuration Example>

Each functional component unit of the terminals 100a-100c, the server 200, the charging cradles 300a-300c, the accounting cradle 400, and the kitchen terminal 500 may be implemented by hardware (e.g., a hardwired electronic circuit or the like) that implements each functional component unit or may be implemented by a combination of hardware with software (e.g., a combination of an electronic circuit and a program that controls this electronic circuit). Hereinafter, a case in which each functional component unit of the terminal 100a and the like is implemented by a combination of hardware with software will be described.

Figure 20:
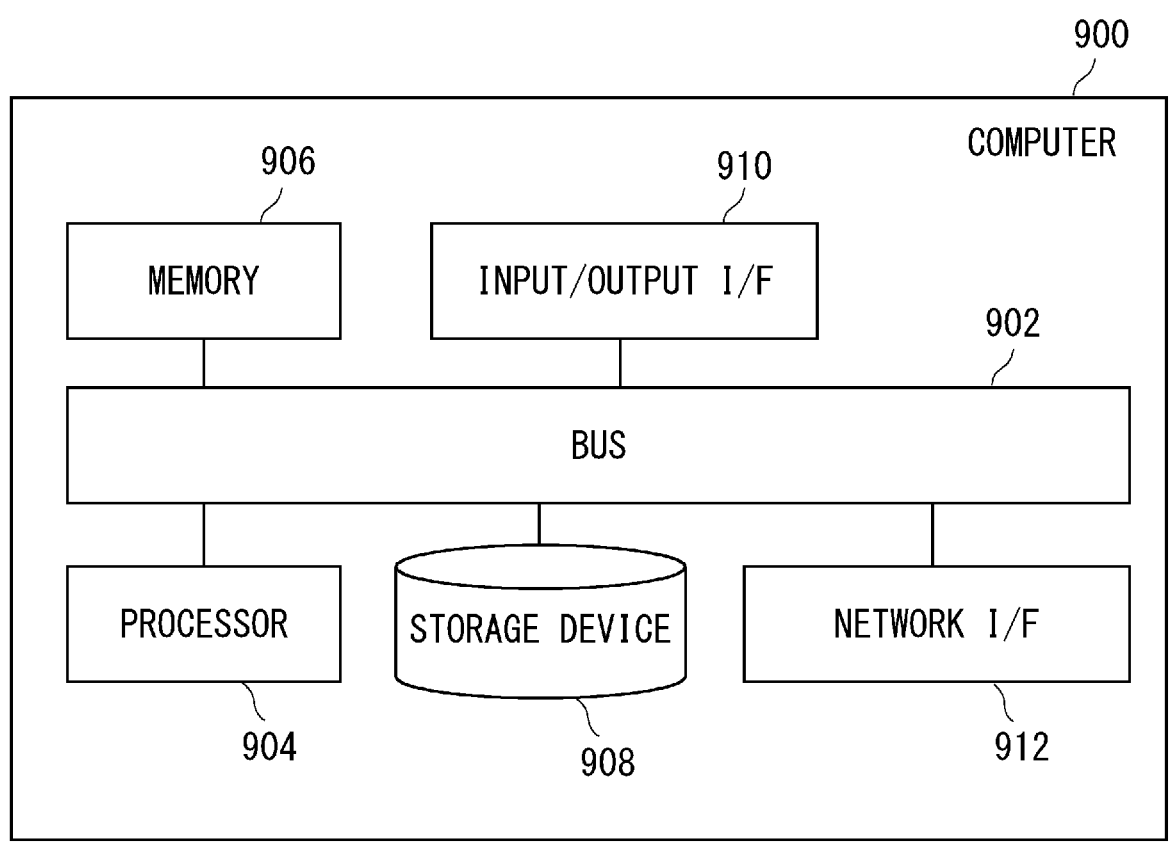
FIG. 20 is a diagram showing a hardware configuration example.

FIG. 20 is a block diagram illustrating a hardware configuration of a computer 900 that implements the terminal 100a and the like. The computer 900 may be a special-purpose computer designed to implement the terminal 100a and the like or may be a general-purpose computer. The computer 900 may be a portable computer such as a smartphone or a tablet terminal.

For example, by installing a predetermined application into the computer 900, each function of the terminal 100a and the like is implemented in the computer 900. The aforementioned application is formed of a program for implementing a functional component unit of the terminal 100a and the like.

The computer 900 includes a bus 902, a processor 904, a memory 906, a storage device 908, an input/output interface 910, and a network interface 912. The bus 902 is a data transmission path for enabling the processor 904, the memory 906, the storage device 908, the input/output interface 910, and the network interface 912 to transmit and/or receive data to and/from one another. However, the method of connecting the processor 904 and the like is not limited to bus connection.

The processor 904 may be any kind of processor such as a Central Processing Unit (CPU), a Graphics Processing Unit (GPU), or a Field-Programmable Gate Array (FPGA). The memory 906 is a main memory unit that is implemented using a Random Access Memory (RAM). The storage device 908 is an auxiliary memory unit that is implemented using a hard disk, a Solid State Drive (SSD), a memory card, a Read Only Memory (ROM) or the like.

The input/output interface 910 is an interface for allowing the computer 900 and an input/output device to be connected to each other. For example, an input device such as a keyboard and/or an output device such as a display device is/are connected to the input/output interface 910.

The network interface 912 is an interface for allowing the computer 900 to be connected to a network. This network may be a Local Area Network (LAN) or may be a Wide Area Network (WAN).

The storage device 908 stores a program for implementing each functional component unit of the terminal 100a or the like (a program for implementing the aforementioned application). The processor 904 loads this program into the memory 906 and executes the loaded program, thereby implementing each functional component unit of the terminal 100*a* or the like.

Each of the processors executes one or more programs including instructions for causing a computer to execute an algorithm. The program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above example embodiments and may be changed as appropriate without departing from the spirit of the present disclosure.

For example, while the order information 193 and the like are transmitted to the server 200 from the terminals 100*a*-100*c*, and the accounting information 294 is created in the server 200 in the aforementioned description, this is merely one example. Each of the terminals 100*a*-100*c* may have a function performed by the server 200. For example, each of the terminals 100*a*-100*c* may accumulate the order information 193 and sums them up, whereby the total price that corresponds to the accounting information 294 may be obtained. The terminals 100*a*-100*c* are able to conduct the accounting processing based on the total price. In this case, the terminals 100*a*-100*c* may transmit the total price and the like to the server 200 at a predetermined timing after the accounting processing is completed.

According to the accounting system, the terminal, the information processing method, and the non-transitory computer readable medium according to the present disclosure, it is possible to enable customers to pay bills more efficiently.

The first and second embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)
An accounting system comprising:
a terminal that is placed on a table used by a customer;
a connection apparatus that is connected to the terminal at the time of accounting; and
a server that communicates with the terminal and the connection apparatus via a network,
wherein
the terminal receives an order for a product from the customer and then transmits table identification information by which the table can be identified and product information regarding the product to the server,
the server stores the table identification information and the product information in association with each other as accounting information, and
the terminal acquires, when the terminal is connected to the connection apparatus, the accounting information associated with the table identification information from the server and then performs accounting processing.

(Supplementary Note 2)
The accounting system according to Supplementary Note 1, wherein
the connection apparatus is connected to an accounting apparatus that performs the accounting processing, and
the terminal performs the accounting processing using the accounting apparatus.

(Supplementary Note 3)
The accounting system according to Supplementary Note 1 or 2, wherein the terminal is a tablet terminal.

(Supplementary Note 4)
The accounting system according to any one of Supplementary Notes 1 to 3, wherein the connection apparatus is a cradle on which the terminal can be placed.

(Supplementary Note 5)
The accounting system according to any one of Supplementary Notes 1 to 4, wherein the terminal and the connection apparatus are connected to each other via a Universal Serial Bus (USB).

(Supplementary Note 6)
The accounting system according to any one of Supplementary Notes 1 to 5, wherein, when the terminal is connected to the connection apparatus, the terminal automatically starts an application for accounting.

(Supplementary Note 7)
The accounting system according to any one of Supplementary Notes 1 to 6, wherein the terminal performs the accounting processing using an accounting method selected from a plurality of accounting methods.

(Supplementary Note 8)
A terminal, wherein
the terminal receives, in a table used by a customer, an order for a product from the customer and then transmits table identification information by which the table can be identified and product information regarding the product to a server via a network, and
when the terminal is connected to a connection apparatus at the time of accounting, the terminal acquires accounting information in which the table identification information and the product information are associated with each other from the server and then conducts accounting processing.

(Supplementary Note 9)
The terminal according to Supplementary Note 8, wherein
the connection apparatus is connected to an accounting apparatus that performs the accounting processing, and
the terminal performs the accounting processing using the accounting apparatus.

(Supplementary Note 10)
A terminal, wherein
the terminal receives, in a table used by a customer, an order for a product from the customer and stores table identification information by which the table can be identified in association with product information regarding the product as accounting information, and when the terminal is connected to a connection apparatus at the time of accounting, the terminal performs accounting processing based on the accounting information associated with the table identification information.

(Supplementary Note 11)

The terminal according to Supplementary Note 10, wherein
the connection apparatus is connected to an accounting apparatus that performs the accounting processing, and
the terminal performs the accounting processing using the accounting apparatus.

(Supplementary Note 12)

An information processing method, wherein
a terminal receives, in a table used by a customer, an order for a product from the customer and then transmits table identification information by which the table can be identified and product information regarding the product to a server via a network, and
when the terminal is connected to a connection apparatus at the time of accounting, the terminal acquires accounting information in which the table identification information and the product information are associated with each other from the server and then conducts accounting processing.

(Supplementary Note 13)

A program for causing a computer to execute an information processing method, wherein
in a table used by a customer, an order for a product is received from the customer and table identification information by which the table can be identified and product information regarding the product are transmitted to a server via a network, and
when the terminal is connected to a connection apparatus at the time of accounting, the terminal acquires accounting information in which the table identification information and the product information are associated with each other from the server and then accounting processing is conducted.

What is claimed is:

1. An accounting system comprising:
a terminal that is placed on a table used by a customer;
a cradle type connection apparatus that is connected to the terminal at the time of accounting by placing the terminal on the connection apparatus; and
a server that communicates with the terminal and the connection apparatus via a network, wherein
the terminal receives an order for a product from the customer and then transmits table identification information by which the table can be identified and product information regarding the product to the server,
the server stores the table identification information and the product information in association with each other as accounting information, and
when the terminal is placed on the connection apparatus and connected to the connection apparatus, the terminal automatically starts an application for accounting and acquires the accounting information associated with the table identification information from the server and then performs accounting processing.

2. The accounting system according to claim 1, wherein the connection apparatus is connected to an accounting apparatus that performs the accounting processing, and the terminal performs the accounting processing using the accounting apparatus.

3. The accounting system according to claim 1, wherein the terminal is a tablet terminal.

4. The accounting system according to claim 1, wherein the terminal and the connection apparatus are connected to each other via a Universal Serial Bus (USB).

5. The accounting system according to claim 1, wherein the terminal performs the accounting processing using an accounting method selected from a plurality of accounting methods.

6. A terminal, wherein
the terminal receives, in a table used by a customer, an order for a product from the customer and then transmits table identification information by which the table can be identified and product information regarding the product to a server via a network, and
when the terminal is placed on a cradle type connection apparatus and connected to a connection apparatus at the time of accounting, the terminal automatically starts an application for accounting and acquires accounting information in which the table identification information and the product information are associated with each other from the server and then conducts accounting processing.

7. The terminal according to claim 6, wherein
the connection apparatus is connected to an accounting apparatus that performs the accounting processing, and
the terminal performs the accounting processing using the accounting apparatus.

8. An information processing method, wherein
a terminal receives, in a table used by a customer, an order for a product from the customer and then transmits table identification information by which the table can be identified and product information regarding the product to a server via a network, and
when the terminal is placed on a cradle type connection apparatus and connected to a connection apparatus at the time of accounting, the terminal automatically starts an application for accounting and acquires accounting information in which the table identification information and the product information are associated with each other from the server and then conducts accounting processing.

* * * * *